US012293476B2

United States Patent
Mukherjee et al.

(10) Patent No.: US 12,293,476 B2
(45) Date of Patent: May 6, 2025

(54) SYSTEMS FOR ESTABLISHING AND CONTROLLING ACCESS AND PRIVILEGES IN A VIRTUAL REALITY COMPUTING ENVIRONMENT BASED ON AUTHENTICATED IDENTITIES

(71) Applicant: BANK OF AMERICA CORPORATION, Charlotte, NC (US)

(72) Inventors: Maharaj Mukherjee, Poughkeepsie, NY (US); George Anthony Albero, Charlotte, NC (US); Prashant Thakur, Gujarat (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 285 days.

(21) Appl. No.: 18/092,476

(22) Filed: Jan. 3, 2023

(65) Prior Publication Data

US 2024/0221323 A1 Jul. 4, 2024

(51) Int. Cl.
| | |
|---|---|
| *G06T 19/00* | (2011.01) |
| *G06F 21/32* | (2013.01) |
| *G06T 7/20* | (2017.01) |
| *G06T 7/70* | (2017.01) |
| *G06V 10/74* | (2022.01) |

(52) U.S. Cl.
CPC ............ *G06T 19/006* (2013.01); *G06F 21/32* (2013.01); *G06T 7/20* (2013.01); *G06T 7/70* (2017.01); *G06V 10/761* (2022.01); *G06F 2221/2141* (2013.01)

(58) Field of Classification Search
None
See application file for complete search history.

(56) References Cited

U.S. PATENT DOCUMENTS

| | | |
|---|---|---|
| 8,026,918 B1 | 9/2011 | Murphy |
| 8,245,283 B2 | 8/2012 | Dawson et al. |
| 9,813,522 B2 | 11/2017 | Van Wie |
| 10,284,454 B2 | 5/2019 | Haggar et al. |
| 10,694,352 B2 | 6/2020 | Coyne |
| 10,924,566 B2 | 2/2021 | Rosedale |
| 10,981,069 B2 | 4/2021 | Kawachiya et al. |
| 11,616,701 B2 | 3/2023 | Brockners et al. |
| 2009/0170604 A1 | 7/2009 | Mueller et al. |
| 2014/0344725 A1 | 11/2014 | Bates et al. |
| 2017/0052676 A1 | 2/2017 | Pulier et al. |

(Continued)

*Primary Examiner* — Yi Wang
(74) *Attorney, Agent, or Firm* — Moore & Van Allen PLLC; Anup Iyer

(57) ABSTRACT

Access control within a virtual reality computing system(s) is provided. Once a user requests entry into a virtual reality computing environment and their identity is verified (i.e., authenticating), access privileges are determined/assigned for the user that restrict or allow user access to virtual locations and/or virtual objects/avatars present in the virtual reality computing environment. In specific instances, the access privileges may be dynamically altered during the user's virtual reality computing session based on the user's interactions or other behaviors exhibited during the user's virtual reality computing session. As such the present invention provides necessary control over what areas of a virtual reality computing environment a user can access and/or which virtual objects/avatars a user can interact with.

17 Claims, 4 Drawing Sheets

(56) References Cited

U.S. PATENT DOCUMENTS

| | | | |
|---|---|---|---|
| 2018/0041603 A1* | 2/2018 | Van Wie | H04L 67/306 |
| 2019/0052471 A1 | 2/2019 | Panattoni et al. | |
| 2020/0129864 A1 | 4/2020 | Tran et al. | |
| 2020/0273477 A1 | 8/2020 | Kwatra et al. | |
| 2020/0335090 A1 | 10/2020 | Freed et al. | |
| 2021/0058397 A1* | 2/2021 | Shuster | G06F 3/04842 |

* cited by examiner

SYSTEMS FOR ESTABLISHING AND CONTROLLING ACCESS AND PRIVILEGES IN A VIRTUAL REALITY COMPUTING ENVIRONMENT BASED ON AUTHENTICATED IDENTITIES

FIELD OF THE INVENTION

The present invention is related generally to computing network security and, more specifically, systems and methods for establishing and controlling access and privileges s in augmented and/or virtual reality computing environments, such as metaverse.

BACKGROUND

The use of augmented and/or virtual reality computing systems (collectively referred to herein as "virtual reality (VR) computing systems) have become increasing more prevalent. By way of example, Metaverse is a hypothetical iteration of the Internet as a single, universal and immersive virtual reality computing systems (including multiple different VR computing systems) that is facilitated by the use of virtual reality and augmented reality headsets. Thus, Metaverse provides the ability for a user to associate with an avatar (i.e., a virtual representation/object of the user) and for the avatar to conduct resource exchange events within a virtual environment. While the resource exchange event is initiated entirely within the virtual environment, it results in an actual exchange of resources between the user and the resource-providing entity.

Such virtual reality environment-based resource exchange events pose security threats. Specifically, resource-providing entities in Metaverse or other virtual reality computing environments may not be who they purport to be (i.e., nefarious entities masquerading as the intended resource providing entity. Since the resource exchange event is occurring in a virtual environment, the measures that need to be taken to address such security threats may be different than those taken to address non-virtual (e.g., physical or online) resource exchange events.

In addition, the open nature of virtual reality computing environments provides for any user, in possession of a virtual object/avatar, to navigate the entirety of virtual reality environment (i.e., visit any virtual location or interact within other virtual object/avatar in the virtual reality environment). However, as a means of guarding against users interacting with nefarious entities or, or in in the case of users under the control/guidance of others, interacting with entities deemed to be inappropriate, it may be advantageous to prevent or otherwise place restrictions on the ability of a user to maneuver to certain areas (i.e., virtual locations) or interact with certain other users (i.e., other virtual objects/avatars).

Therefore, a need exists to develop systems, methods, computer program products and the like which provide security for interactions that occur in virtual reality computing environments, such as Metaverse or the like. In this regard, the desired systems, methods and the like should provide the ability to restrict and allow a user to access designated virtual locations or interact with designated virtual objects/avatars. Moreover, the access privileges should not only be granted at the inception of a user's virtual reality computing session, but also, the access privileges should remain fluid throughout the session (i.e., provide the ability dynamically alter the access privileges).

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing for the control of access privileges within virtual reality computing system(s), such as Metaverse or the like. In response to a user requesting entry into a virtual reality computing environment and verifying the identity (i.e., authenticating) of the user, access privileges are determined for the user that restrict or allow user access to virtual locations and/or virtual objects/avatars present in the environment. In further instances, the access privileges may be projected on other users, such that other users (i.e., other virtual objects/avatars) are allowed or restricted from interacting with the user. The access privileges may be determined/defined for a user based on one or more predefined roles (e.g., employment classifications, life duration and the like). In addition, access privileges may be determined by accessing internal or external databases that store data associated with the users including, in some instances the predefined access privileges. In specific instances, at least a portion of the access privileges may be defined/controlled by third-party entities (e.g., parents/guardians/employers) or the like.

In response to determining the access privileges, the access privileges are implemented during the user's ensuing virtual reality computing session. In this regard, the access privileges provide permissions for a user to enter into certain virtual locations/areas and to interact with certain virtual objects/avatars (i.e., other users) or, conversely, the access privileges provide restrictions (e.g., warnings or denial) for a user to enter into certain virtual locations/areas and to interact with certain virtual objects/avatars (i.e., other users).

Implementing the access privileges that restrict access may provide for defining a virtual sphere of proximity for each restricted virtual location, and/or virtual object. In such embodiments of the invention, when the authenticated user maneuvers their respective virtual object/avatar within the virtual sphere of proximity the user is denied further entry/interaction with the virtual location and/or virtual object/avatar and/or is presented an visual and/or audible warning that notifies the user of their restricted access to the corresponding virtual location or virtual object.

Additionally, the invention may provide for monitoring the user's virtual interactions during their ensuing virtual reality and, as a result of the monitoring, determine that the user (i.e., the virtual object/avatar associated with the user) interacts or attempts to interact with a restricted virtual location and/or a restricted virtual object/avatar. In response to determining an interaction, the invention may alter the access privileges for a corresponding user during the current user session (i.e., dynamic alteration of access privileges) and/or during subsequent user sessions within the virtual reality computing environment.

Moreover, the authentication of the user may not only occur at the onset of the user's virtual reality computing session but may also occur continuously throughout the corresponding user session within the virtual reality computing environment. Continuous authentication may occur through continual capture of user physical characteristics (e.g., facial images, fingerprints, or the like) or through multi-factored authentication performed at various intervals during the user session. In such embodiments of the invention, the type and/or timing of the multi-factored authentication may be based one or user session attributes.

A system for controlling access privileges within virtual reality computing environments defines first embodiments of the invention. The system includes at least one virtual reality computing system and, in specific embodiments, multiple virtual reality computing systems interconnected by a distributed computing network (i.e., the so-called "Metaverse"). Each virtual reality computing system has a computing platform including a memory and one or more computing processor devices in communication with the memory. The memory stores a virtual reality (VR) application that is executable by at least one of the one or more computing processor devices. The VR application is configured to present a virtual reality computing environment that includes a plurality of virtual locations defined by virtual boundaries, each virtual location associated with a non-virtual entity. The virtual reality computing environment is configured to present a plurality of virtual objects (i.e., otherwise referred to as "avatars"). Each virtual object is under control of a user and configured to virtually interact with (i) other virtual objects from amongst the plurality of virtual objects and (ii) the plurality of virtual locations.

The memory of the virtual reality computing system additionally includes an authentication application and an access control application that are executable by at least one of the one or more computing processor devices. The authentication application is configured to, in response to users requesting entry to the virtual reality computing environment, authenticate an identity of each user of the plurality of virtual objects. In response to authentication, the access control application is further configured to determine access privileges for each user based at least on the identity of each user. The access privileges restrict or allow user access to at least one chosen from the group consisting of (i) one or more of the virtual locations, and (ii) one or more of the virtual objects. In response to determining the access privileges, the access control application is further configured implement the access privileges, for each user, during a corresponding user session within the virtual reality computing environment.

In specific embodiments of the system, implementation of the access privileges includes restricting user access to at least one chosen from the group consisting of (i) one or more of the virtual locations, and (ii) one or more of the virtual objects. Restricting user access is provided by defining a virtual sphere of proximity for each of the at least one of (i) the one or more of the virtual locations, and (ii) the one or more of the virtual objects, and, in response to a virtual object associated with an authenticated user coming in contact with the virtual sphere of proximity, providing for (i) forbidding the virtual object from further interaction with the corresponding virtual location or the corresponding virtual object, and/or (ii) presenting a visual or audible warning to the user that notifies the user of their restricted access to the corresponding virtual location or corresponding virtual object.

In other specific embodiments of the system, the access control application is further configured to determine the access privileges for each user based further on at least one role associated with the identity of each user. The role may be defined by a third-party entity or may be defined based on characteristics of the user (e.g., time of life or the like).

In further specific embodiments of the system, the access control application is further configured to monitor, for each user, virtual interactions between a virtual object associated a corresponding user and (i) the other virtual objects and (ii) the plurality of virtual locations. As a result of the monitoring, determine that the virtual object associated with the corresponding user interacts with at least one chosen from the group consisting of (i) the one or more of the virtual locations having access restrictions, and (ii) the one or more of the virtual objects having access restrictions. In response to determining an interaction, alter the access privileges for a corresponding user during at least one chosen from the group consisting of (i) the user session and (ii) further user sessions within the virtual reality computing environment.

In still further specific embodiments of the system, the access control application is further configured to determine the access privileges for each user by accessing an internal database that stores predefined access privileges for each user. In such embodiments of the system, at least a portion of the predefined access privileges are defined by a third-party entity (e.g., employer, family member or the like) other than the user and the virtual reality computing system. In related specific embodiments of the system, the access control application is further configured to determine the access privileges for each user by accessing an external database (e.g., government database or the like) that stores data associated with one or more of the users and determining the access privileges for the least one or more of the users based at least on the data.

In other specific embodiments of the system, the access control application is further configured to determine the access privileges wherein the access privileges further restrict or allow other virtual objects associated with other users to interact with the virtual object controlled by the user.

Moreover, in further embodiments of the system, the authentication application is further configured to authenticate the identity of each user of the plurality of virtual objects continuously throughout the corresponding user session within the virtual reality computing environment. Continuous authentication may involve continuously capturing physical characteristic data of the user (e.g., facial images, fingerprints or the like) and/or multi-factored authentication (e.g., at various intervals communicating codes to a trusted device or the like). In related embodiments of the system, the authentication control application is further configured to authenticate the identity of each user of the plurality of virtual objects continuously throughout the corresponding user session by implementing multi-factor authentication at various times throughout the corresponding user session. In such embodiments of the system, (i) a type of multi-factor authentication and/or (ii) a time for implementing multi-factor authentication is determined based on one or more user session parameters. The user session parameters may include, but are not limited to, (a) current duration of the user session, (b) current virtual location of the user within the virtual reality computing environment, (iii) actual physical location at which the user is currently located, (iv) the virtual reality computing system in which the user resides, (v) a computing device which the user is using to conduct the user session, (vii) direction or speed of movement of the virtual object controlled by the user during the user session, (viii) current behaviors of the user during the user session, and (ix) previous behaviors of the user during previous user sessions.

A computer-implemented method for providing authentication in a virtual reality computing environment. The method is executed by one or more computing processor devices. The method includes presenting at least one virtual reality computing environment that includes a plurality of virtual locations defined by virtual boundaries. Each virtual location associated with a non-virtual entity. The virtual reality computing environment is configured to present a plurality of virtual objects, each virtual object is under control of a user and is configured to virtually interact with (i) other virtual objects from amongst the plurality of virtual objects and (ii) the plurality of virtual location. In response to users requesting entry to the at least one virtual reality computing environment, the method further includes authenticating an identity of each user of the plurality of virtual objects, and, in response to authentication, determining access privileges for each user based at least on the identity of each user. The access privileges restrict or allow user access to at least one chosen from the group consisting of (i) one or more of the virtual locations, and (ii) one or more of the virtual objects. In response to determining the access privileges, the method includes implementing the access privileges, for each user, during a corresponding user session within the virtual reality computing environment.

In specific embodiments of the computer-implemented method, implementing the access privileges further includes defining a virtual sphere of proximity for each of the at least one of (i) the one or more of the virtual locations, and (ii) the one or more of the virtual objects, and, in response to a virtual object associated with an authenticated user coming in contact with the virtual sphere of proximity, providing for at least one chosen from the group consisting of (i) forbidding the virtual object from further interaction with the corresponding virtual location or the corresponding virtual object, and (ii) presenting a visual or audible warning to the user that notifies the user of their restricted access to the corresponding virtual location or corresponding virtual object.

In other specific embodiments the computer-implemented method further includes monitoring, for each user, virtual interactions between a virtual object associated a corresponding user and (i) the other virtual objects and (ii) the plurality of virtual locations and, as a result of the monitoring, determining that the virtual object associated with the corresponding user interacts with at least one chosen from the group consisting of (i) the one or more of the virtual locations having access restrictions, and (ii) the one or more of the virtual objects having access restrictions. In response to determining an interaction, the method further includes altering the access privileges for a corresponding user during at least one chosen from the group consisting of (i) the user session and (ii) further user sessions within the virtual reality computing environment.

In still further specific embodiments, the computer-implemented method further includes authenticating the identity of each user of the plurality of virtual objects continuously throughout the corresponding user session by implementing multi-factor authentication at various times throughout the corresponding user session. In such embodiments, at least one of (a) a type of multi-factor authentication and (b) a time for implementing multi-factor authentication is determined based on one or more user session parameters. The user session parameters include, but are nor inclusive of, at least one of (i) current duration of the user session, (ii) current virtual location of the user within the virtual reality computing environment, (iii) actual physical location at which the user is currently located, (iv) a virtual reality computing system from amongst the at least one virtual reality computing system, (v) a computing device which the user is using to conduct the user session, (vii) direction or speed of movement of the virtual object controlled by the user during the user session, (viii) current behaviors of the user during the user session, and (ix) previous behaviors of the user during previous user sessions.

A computer program product including a non-transitory computer-readable medium defines third embodiments of the invention. The computer-readable medium includes sets of codes for causing one or more computing processing devices to present at least one virtual reality computing environment that includes a plurality of virtual locations defined by virtual boundaries. Each virtual location associated with a non-virtual entity. The virtual reality computing environment is further configured to present a plurality of virtual objects. Each virtual object under control of a user and configured to virtually interact with (i) other virtual objects from amongst the plurality of virtual objects and (ii) the plurality of virtual locations. The sets of codes further cause one or more computing processing devices to, in response to users requesting entry to the at least one virtual reality computing environment, authenticate an identity of each user of the plurality of virtual objects, and in response to authentication, determine access privileges for each user based at least on the identity of each user, wherein the access privileges restrict or allow user access to at least one chosen from the group consisting of (i) one or more of the virtual locations, and (ii) one or more of the virtual objects. In response to determining the access privileges, sets of codes further cause one or more computing processing devices to implement the access privileges, for each user, during a corresponding user session within the virtual reality computing environment.

In specific embodiments of the computer program product, the set of codes for causing the one or more computing processing devices to implement the access privileges further cause the one or more computing processing devices to define a virtual sphere of proximity for each of the at least one of (i) the one or more of the virtual locations, and (ii) the one or more of the virtual objects, and in response to a virtual object associated with an authenticated user coming in contact with the virtual sphere of proximity, provide for at least one chosen from the group consisting of (i) forbidding the virtual object from further interaction with the corresponding virtual location or the corresponding virtual object, and (ii) presenting a visual or audible warning to the user that notifies the user of their restricted access to the corresponding virtual location or corresponding virtual object.

In other specific embodiments of the computer program product, the sets of codes further include sets of codes for causing the one or more computing processing devices to monitor, for each user, virtual interactions between a virtual object associated a corresponding user and (i) the other virtual objects and (ii) the plurality of virtual locations. As a result of the monitoring, the set of codes further cause the one or more computing processing devices to determine that the virtual object associated with the corresponding user interacts with at least one chosen from the group consisting of (i) the one or more of the virtual locations having access restrictions, and (ii) the one or more of the virtual objects having access restrictions. In response to determining an interaction, the set of codes further cause the one or more computing processing devices to alter the access privileges for a corresponding user during at least one chosen from the group consisting of (i) the user session and (ii) further user sessions within the virtual reality computing environment In additional specific embodiments of the computer program product the sets of codes further comprise a set of codes for causing the one or more computing processing devices to authenticate the identity of each user of the plurality of virtual objects continuously throughout the corresponding user session by implementing multi-factor authentication at various times throughout the corresponding user session. In such embodiments of the computer program product, (a) a type of multi-factor authentication and/or (b) a time for implementing multi-factor authentication are determined based on one or more user session parameters. The user session parameters may include, but are not limited to, (i) current duration of the user session, (ii) current virtual location of the user within the virtual reality computing environment, (iii) actual physical location at which the user is currently located, (iv) a virtual reality computing system from amongst the at least one virtual reality computing system, (v) a computing device which the user is using to conduct the user session, (vii) direction or speed of movement of the virtual object controlled by the user during the user session, (viii) current behaviors of the user during the user session, and (ix) previous behaviors of the user during previous user sessions.

Thus, according to embodiments of the invention, which will be discussed in greater detail below, the present invention provides for the control of access privileges within virtual reality computing system(s), such as Metaverse or the like. Once a user requests entry into a virtual reality computing environment and their identity is verified (i.e., authenticating), access privileges are determined/assigned for the user that restrict or allow user access to virtual locations and/or virtual objects/avatars present in the environment. In specific embodiments of the invention, the access privileges may be dynamically altered during the user's virtual reality computing session based on the user's interactions or other behaviors exhibited during the user's virtual reality computing session. As such the present invention provides necessary control over what areas of a virtual reality computing environment a user can access and/or which virtual objects/avatars a user can interact with.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
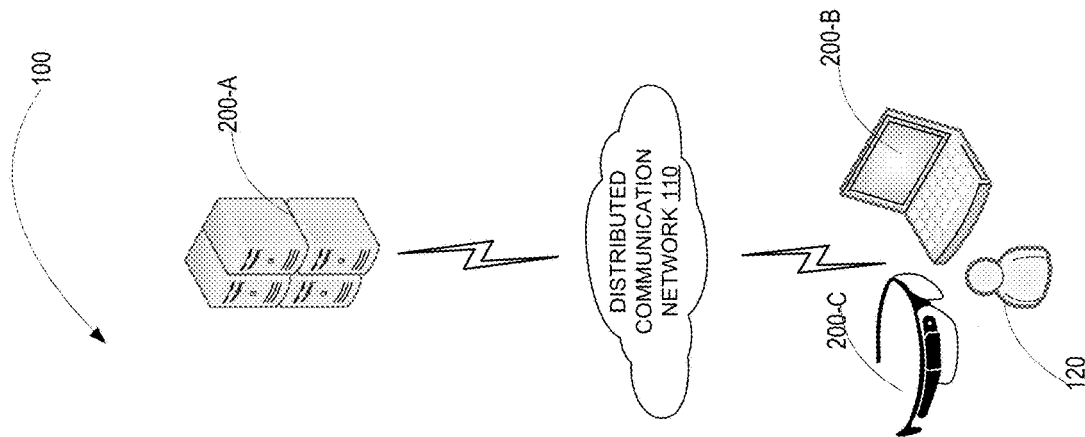
Figure 1:
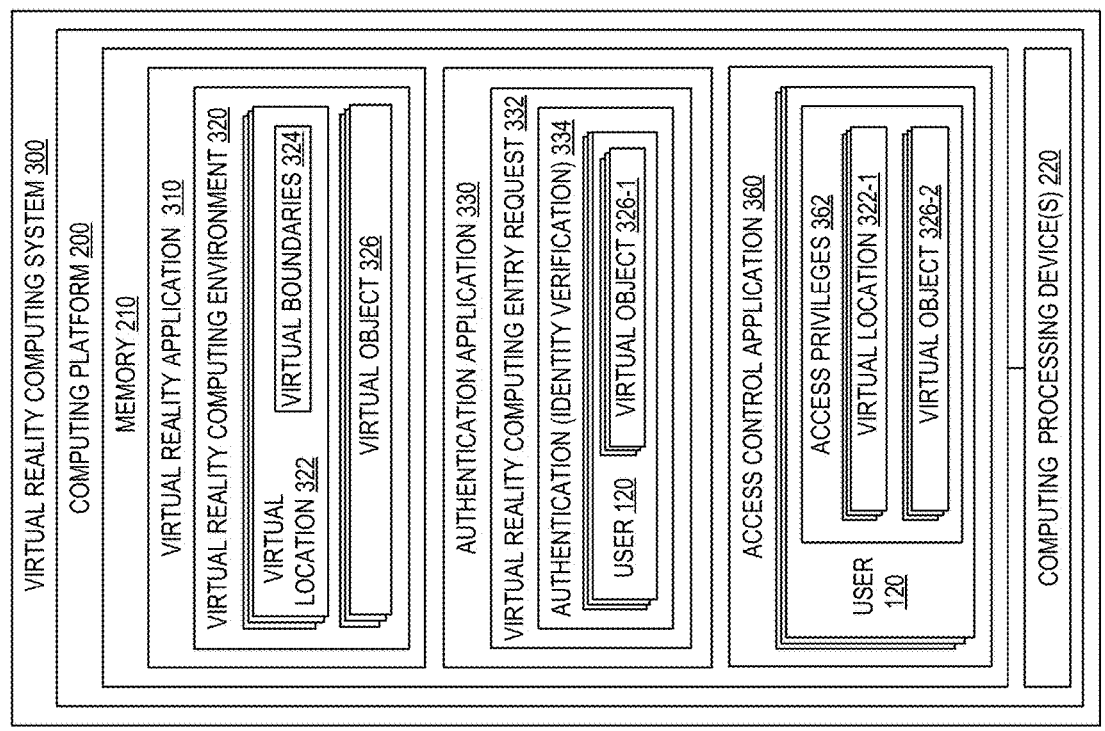
Figure 2:
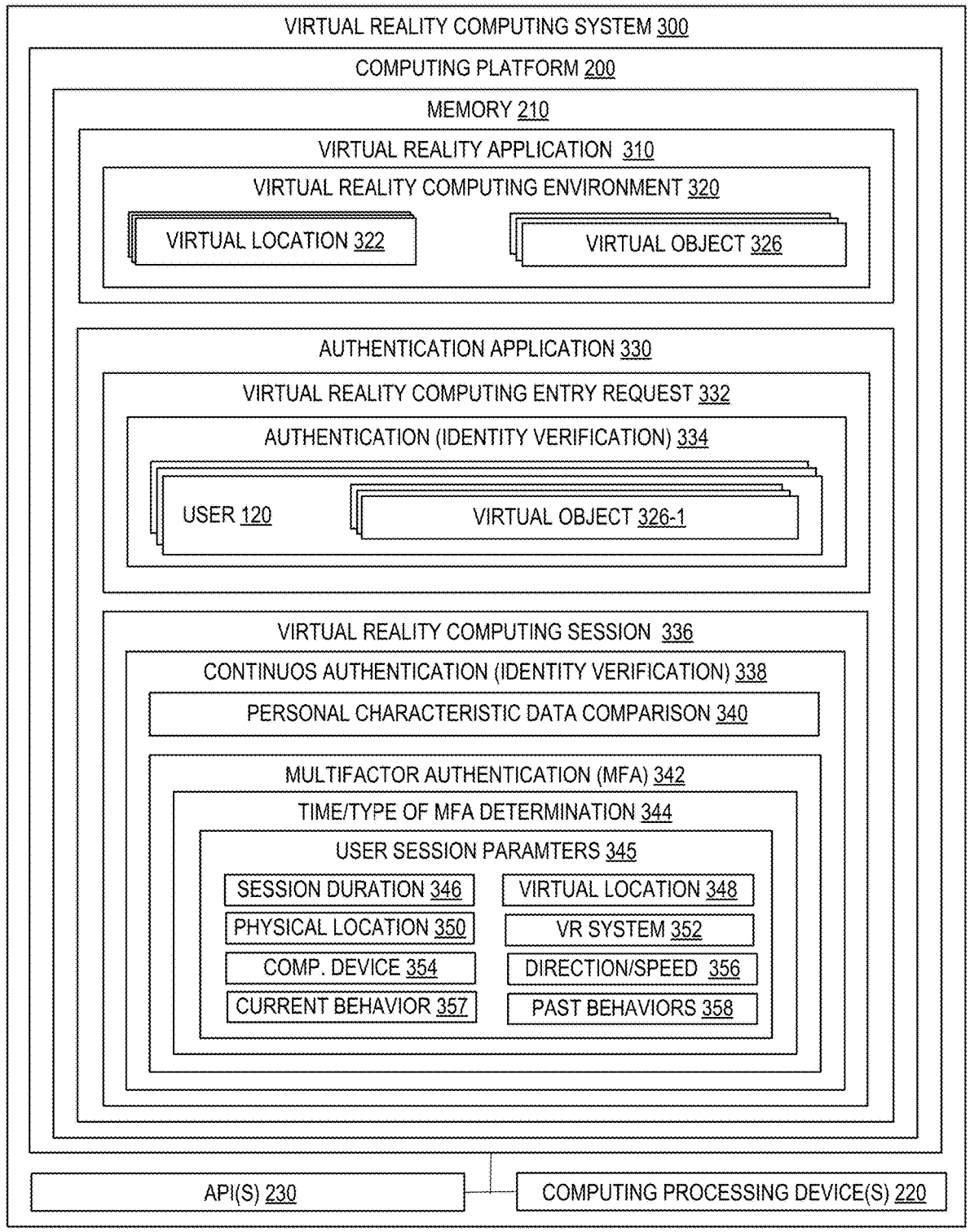
Figure 3:
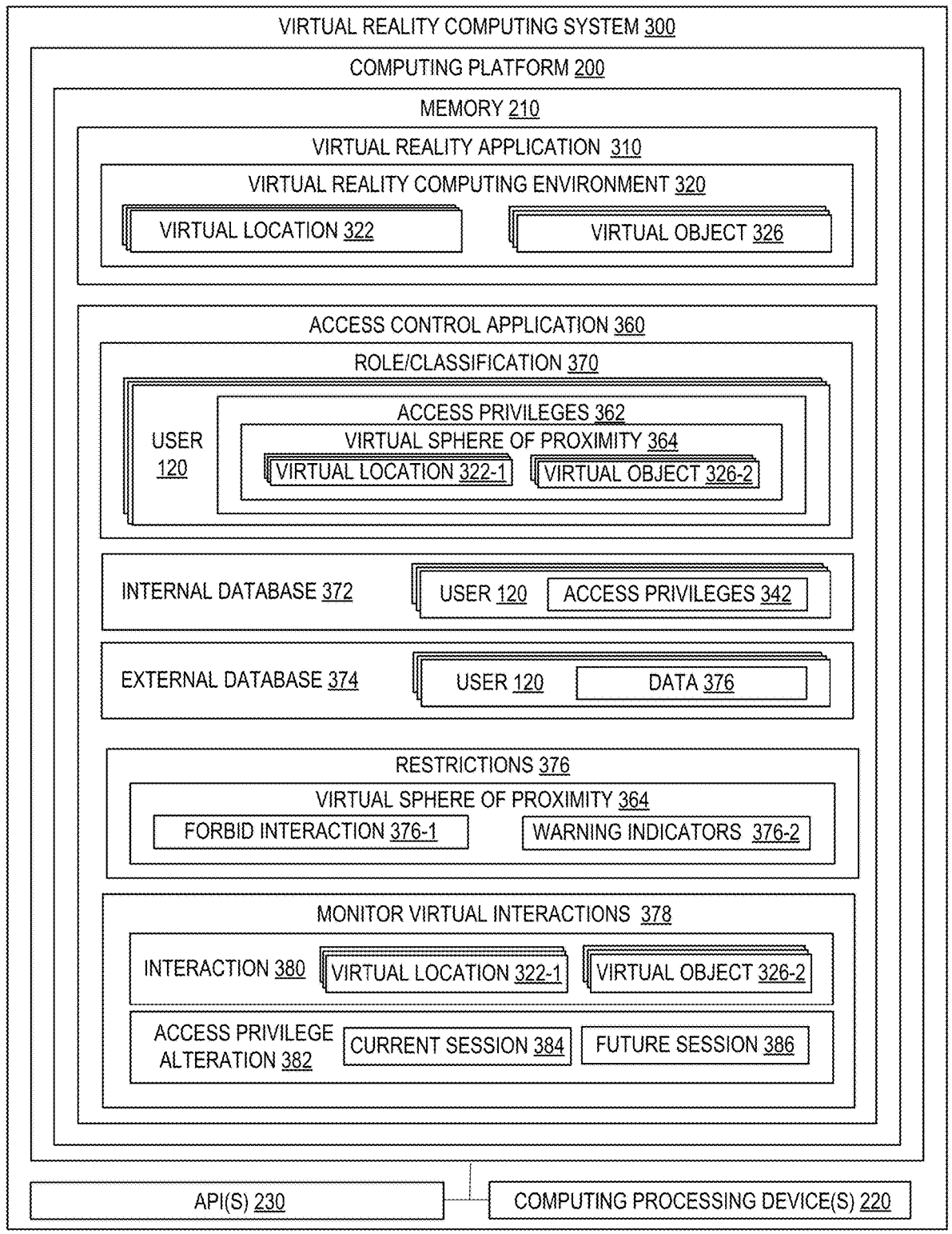
Figure 4:
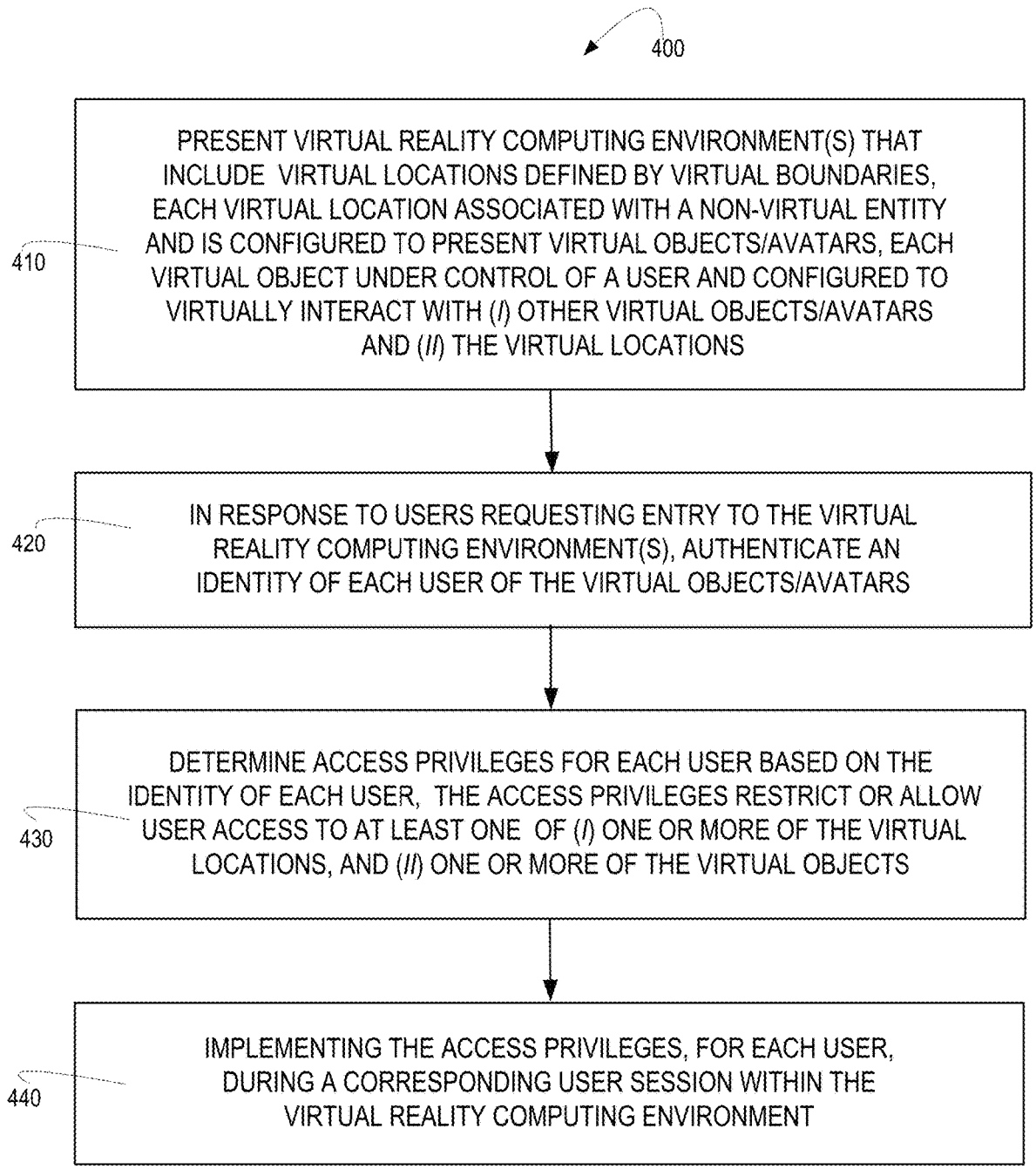

Having thus described embodiments of the disclosure in general terms, reference will now be made to the accompanying drawings, wherein:

FIG. 1 is a schematic/block diagram of system for controlling access and privileges within a virtual reality computing environment, in accordance with embodiments of the present invention;

FIGS. 2 and 3 are block diagrams of a virtual reality computing system including a virtual reality application, an authentication application and an access control application, in accordance with embodiments of the present invention; and FIG. 4 is a flow diagram of a method for controlling access privileges within a virtual reality computing environment, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as a system, a method, a computer program product or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++, PYTHON or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or systems. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform or "configured for" performing a certain function in a variety of ways, including, for example, by having one or more general-purpose circuits perform the function by executing particular computer-executable program code embodied in computer-readable medium, and/or by having one or more application-specific circuits perform the function.

As used herein, "virtual reality computing system", which includes augmented reality computing systems, such as the Metaverse or the like may refer to a collection of persistent, shared, three-dimensional virtual spaces linked into a perceived virtual universe. In some embodiments, a virtual reality computing systems may not only refer to virtual worlds, but the Internet as a whole, including the spectrum of augmented reality. A virtual reality computing environment may include a number of different elements such as video conferencing, digital currencies, virtual reality platforms, social media, live data streaming, digital representations of real-life objects and/or the like. In some embodiments, a virtual reality computing environment may include virtual properties, such as virtual land parcels and estates for users to create and build-on, or structures that reflect real-life properties and/or completely original creations. These spaces may be represented by co-ordinates on the metaverse platform where users can meet up using their avatars (i.e., virtual objects) to socialize and decorate their own spaces with collectibles. Any combination of the aforementioned elements may form a computer-mediated virtual environment, i.e., a virtual world, within the metaverse. Within this self-sustaining, persistent, and shared realm, users may exist and interact with each other using their digital avatars (i.e., virtual objects).

Thus, according to embodiments of the invention, which will be described in more detail below, systems, methods and computer program products are disclosed that provide for the control of access privileges within virtual reality computing system(s), such as Metaverse or the like. In response to a user requesting entry into a virtual reality computing environment and verifying the identity (i.e., authenticating) of the user, access privileges are determined for the user that restrict or allow user access to virtual locations and/or virtual objects/avatars present in the environment. In further instances, the access privileges may be projected on other users, such that other users (i.e., other virtual objects/avatars) are allowed or restricted from interacting with the user. The access privileges may be determined/defined for a user based on one or more predefined roles (e.g., employment classifications, life duration and the like). In addition, access privileges may be determined by accessing internal or external databases that store data associated with the users including, in some instances the predefined access privileges. In specific instances, at least a portion of the access privileges may be defined/controlled by third-party entities (e.g., parents/guardians/employers) or the like.

In response to determining the access privileges, the access privileges are implemented during the user's ensuing virtual reality computing session. In this regard, the access privileges provide permissions for a user to enter into certain virtual locations/areas and to interact with certain virtual objects/avatars (i.e., other users) or, conversely, the access privileges provide restrictions (e.g., warnings or denial) for a user to enter into certain virtual locations/areas and to interact with certain virtual objects/avatars (i.e., other users).

Implementing the access privileges that restrict access may provide for defining a virtual sphere of proximity for each restricted virtual location, and/or virtual object. In such embodiments of the invention, when the authenticated user maneuvers their respective virtual object/avatar within the virtual sphere of proximity the user is denied further entry/interaction with the virtual location and/or virtual object/avatar and/or is presented an visual and/or audible warning that notifies the user of their restricted access to the corresponding virtual location or virtual object.

Additionally, the invention may provide for monitoring the user's virtual interactions during their ensuing virtual reality and, as a result of the monitoring, determine that the user (i.e., the virtual object/avatar associated with the user) interacts or attempts to interact with a restricted virtual location and/or a restricted virtual object/avatar. In response to determining an interaction, the invention may alter the access privileges for a corresponding user during the current user session (i.e., dynamic alteration of access privileges) and/or during subsequent user sessions within the virtual reality computing environment.

Moreover, the authentication of the user may not only occur at the onset of the user's virtual reality computing session but may also occur continuously throughout the corresponding user session within the virtual reality computing environment. Continuous authentication may occur through continual capture of user physical characteristics (e.g., facial images, fingerprints or the like) or through multi-factored authentication performed at various intervals during the user session. In such embodiments of the invention, the type and/or timing of the multi-factored authentication may be based one or user session attributes.

Referring to FIG. 1, a schematic/block diagram is presented of a system 100 for controlling access and privileges in a virtual reality computing system, in accordance with embodiments of the invention. The system 100 is implemented within a distributed communication network 110, which may include the Internet, one or more intranets, one or more cellular networks or the like. The system 100 includes at least one virtual reality computing system 300 that includes a computing platform 200. The computing platform 200 may comprise network-based component(s), such as application server 200-A, user-based component(s) associated with a virtual reality computing environment user 120, such as laptop computing apparatus 200-B or augmented/virtual reality headset 200-C or a combination of network-based components and user-based components. Computing platform 200 includes a memory 210 and one or more computing processing devices 220 in communication with memory 210.

Memory 210 stores virtual reality application 310, which is executable by at least one of the one or more computing processor devices 220. As previous discussed for purposes of the present invention the phrase "virtual reality" includes augmented reality, such as the Metaverse and any other simulated human-like experience.

Virtual reality application 310 is configured to present, to user 120, a virtual reality computing environment 320 that includes a plurality of virtual locations 322 having virtual boundaries 324 and associated with a non-virtual entity. In addition, the virtual reality computing environment 320 is configured to present a plurality of virtual objects 326, such as avatars or the like, under the control of users 120, which are configured to, upon directive of user 120, virtually interact with other virtual objects from amongst the plurality of virtual objects 326 and virtual move within the virtual locations 322.

Memory 210 additionally stores authentication application 330 that is executable by at least one of the one or more computing processing devices 220. Authentication application 230 is configured to, in response to receiving a virtual reality computing entry request 332 from a user 120 requesting entry into the virtual reality computing environment 320, perform authentication 334 of the user 120 to verify the identity of the user 120 of one or more of the virtual objects 326-1.

In addition, memory 310 stores an access control application 360 that is executable by one or more of the computing processor devices 220. In response to performing successful authentication 334 of the user 120, access control application 360 is configured to determine access privileges 362 for the user 120 based at least on the authenticated identity of the user 120. The access privileges 362 ate configured to restrict or allow user access to at least the virtual locations 322-1, and/or restrict or allow interaction with one or more of the virtual objects 362-2. In response to determining the access privileges 362, access control application 360 is configured to implement the access privileges 362, for each user, during an ensuing user session within the virtual reality computing environment 320.

Referring to a FIGS. 2 and 3, block diagrams are presented of virtual reality computing system 300. As previously noted, the system of the present invention may include multiple virtual reality computing system 300, which are interconnected via distributed communication networks or the like, such as the Metaverse or the like. In addition to providing greater details of authentication application 330 and the access control application 360, FIGS. 2 and 3 highlight various alternate embodiments of the invention. Virtual reality computing system 300 is implemented within computing platform 200, which may comprise one or multiple devices, such as servers, laptops, virtual reality devices or the like. Computing platform 200 includes memory 210, which may comprise volatile and/or non-volatile memory, such as read-only and/or random-access memory (RAM and ROM), EPROM, EEPROM, flash cards, or any memory common to computing platforms). Moreover, memory 210 may comprise cloud storage, such as provided by a cloud storage service and/or a cloud connection service.

Further, computing platform 200 includes one or more first computing processing devices 220, which may be an application-specific integrated circuit ("ASIC"), or other chipset, logic circuit, or other data processing device. Computing processing device(s) 220 may execute one or more application programming interface (APIs) 230 that interface with any resident programs, such as virtual reality application 310, authentication application 330, access control application 360 or the like, stored in memory 210 of computing platform 200 and any external programs. Computing processing devices(s) 220 may include various processing subsystems (not shown in FIGS. 2 and 3) embodied in hardware, firmware, software, and combinations thereof, that enable the functionality of computing platform 200 and the operability of computing platform 200 on a distributed communication network 110 (shown in FIG. 1), such as the Internet, intranet(s), cellular network(s) and the like. For example, processing subsystems allow for initiating and maintaining communications and exchanging data with other networked devices. For the disclosed aspects, processing subsystems of computing platform 200 may include any subsystem used in conjunction with virtual reality application 310, authentication application 330, access control application 360 and related tools, routines, sub-routines, algorithms, sub-algorithms, sub-modules thereof.

In specific embodiments of the present invention, computing platform 200 additionally includes a communications module (not shown in FIGS. 2 and 3) embodied in hardware, firmware, software, and combinations thereof, that enables electronic communications between computing platform 200 and other networks and network devices. Thus, communication module may include the requisite hardware, firmware, software and/or combinations thereof for establishing and maintaining a network communication connection with one or more devices and/or networks.

Memory 210 of computing platform 200 stores virtual reality application 210, which may be a web-based application or a local-application stored on a user device. As previously discussed in relation to FIG. 1, virtual reality application 210 is configured to present, to user 120, a virtual reality computing environment 320 that includes a plurality of virtual locations 322 associated with a non-virtual entity. In addition, the virtual reality computing environment 320 is configured to present a plurality of virtual objects 326, such as avatars or the like, under the control of users 120, which are configured to, upon directive of user 120, virtually interact with other virtual objects from amongst the plurality of virtual objects 326 and virtual move into and out of the virtual locations 322.

Memory 210 additionally stores authentication application 330 that is executable by at least one of the one or more computing processing devices 220. Authentication application 230 is configured to, in response to receiving a virtual reality computing entry request 332 from a user 120 requesting entry into the virtual reality computing environment 320, perform authentication 334 of the user 120 to verify the identity of the user 120 of one or more of the virtual objects 326-1.

In specific embodiments of the invention, authentication application 330 is configured to perform continuous authentication 338 of the user 120 throughout the duration virtual reality computing session 336. In such embodiments of the invention, continuous authentication 338 may include personal characteristic data comparison 340, in which a user's personal characteristic data is continuously captured (e.g., facial images captured by a camera within a virtual reality headset, fingerprints captured by an entertainment controller or the like) and compared to known personal characteristic of the user.

In other embodiments of the invention, continuous authentication 338 may include multifactor (MFA) authentication 342. In such embodiments of the invention, authentication application 330 may be configured to perform a time for or type of MFA determination 344 based on user session parameters/characteristics 345. The determination 344 may determined what type of authentication to perform or the time during the user session for performing the authentication. User session parameters/characteristics 345 may include, but are not limited to, (i) the current user session duration 346, (ii) the current virtual location 348 of the user's virtual object within the virtual reality computing environment, (iii) the current physical (i.e., geo) location 350 of the user, (iv) the virtual reality computing system 352 that the user is currently interacting with, (v) the computing device 354 that the user is currently using to access the virtual reality computing environment, (vii) the direction and/or speed 356 of movement of the user's virtual object, (viii) the current behavior 356 of the user in the virtual reality computing environment and/or (ix) previous behavior 358 of the user in the virtual reality computing environment during previous user sessions.

Similar continuous authentication techniques are disclosed in U.S. patent application Ser. No. 18/054,754, filed on Nov. 11, 2022, entitled "System and Method for Authenticating an Avatar Associated with a User within a Metaverse using Biometric Indicators", and assigned to the same inventive entity as the present application. U.S. patent application Ser. No. 18/054,754 is herein incorporated by reference as if set forth fully herein.

As depicted in FIG. 3, access control application 360 is further configured to determine access privileges 362 based on a role/classification 370 of the user 120. For example, the role may entail a user's job or life duration group/stage. In further specific embodiments of the invention, access control application 360 is further configured to determine access privileges 362 by accessing an internal database 372 that associates users 120 with access privileges 342 and/or roles associated with users 120 and/or access privileges 342. In such embodiments of the invention, at least a portion of the access privileges 342 associated with a user 120 may be defined by a third-party entity, such as an employer, organization, guardian/parent or the like. In other embodiments of the invention, access control application 360 is further configured to determine access privileges 362 by accessing an external database 374 that stores data 376 associated with users 120. For example, the external database 374 may be a government database or the like that stores data 376 associated with malfeasances conducted by the user or other security issues related to the user 120.

It should be noted that the restrictions or allowances may be further defined as time dependent. This means that the restriction or allowance to enter into a virtual location 326-1 or interact with a virtual object 326-2 may be limited to specified times of day, week, month, year or the like.

In further embodiments of the invention, access control application 360 is further configured to implement the access privileges 362 by defining a virtual sphere of proximity 364 around restricted virtual locations 322-1 and/or restricted virtual object 326-2. The virtual sphere of proximity 364 may be equal to or exceed the virtual boundaries 324 forming the perimeter of the virtual location 322-1. In the case of restricted virtual objects 326-2, the virtual sphere of proximity 364 surrounds the virtual object 326-2 and follows the virtual object 326-2 as the virtual object 326-2 moves throughout the virtual reality computing environment 320. Further, in response to a virtual object 326-1 associated with the user 120 coming in contact with the virtual sphere of proximity 364 of a restricted virtual location 322-1 and/or restricted virtual object 326-2, the access control application 360 is further configured to provide restrictions 376 including at least one of (i) forbidding 376-1 the virtual object 326-1 of the user 120 from further entry into the virtual location 322-1 or further interaction with the virtual object 326-2, and/or (ii) presenting a sensory-perceptible (e.g., visual or audible) warning indicator 376-2 that indicate to the user 120 that they are restricted from accessing the virtual location 322-1 or interacting with the virtual object 326-2. In such embodiments of the invention, warning indicator 376-2 may merely warn the user but not prevent the user 120 from further accessing of the virtual location 322-1 or interacting with the virtual object 326-2. While in other embodiments of the invention, warning indicator 376-2 serves to notify the user 120 that the user is blocked/forbidden from further accessing of the virtual location 322-1 or interacting with the virtual object 326-2.

In other embodiments of the invention, the access control application 360 is further configured to monitor virtual interactions 378 during the user's virtual reality computing session and, based on the monitoring, perform access privilege alteration 382 for the current user session 384 and/or for future user sessions 386. In such embodiments of the invention, the access control application 360 is further configured to monitor for interactions/contact with restricted virtual locations 322-1 and/or restricted virtual objects 326-1 and based on determinations that the user has, or in some embodiments has not, interacted or come in contact with restricted virtual locations 322-1 and/or restricted virtual objects 326-1, the access privileges may be altered 382 (e.g., restrictive access privileges added or, if warranted, restrictive access privileges removed).

Referring to FIG. 4, a flow diagram is presented of a method 400 for controlling access and privileges in a virtual reality computing environment, in accordance with embodiments of the present invention. At Event 410, a virtual reality computing environment (e.g., the Metaverse and including augmented reality computing environments) is presented to a user. The virtual reality computing environment includes a plurality of virtual locations defined by virtual boundaries or 2-dimensional or 3-dimensional areas; each virtual location is associated with a non-virtual (i.e., actual) entity. Additionally, the virtual reality computing environment is configured to present a plurality of virtual objects (e.g., an avatar) that are under the control of users and configured to, upon input by the user, move into and out of the virtual locations and interact with other virtual objects.

At Event 420, in response to users requesting entry into the virtual reality computing environment, the identity of each user is authenticated or otherwise verified. Authentication may be performed by any known means of authentication including multifactor authentication, physical/personal characteristic comparison, issuing a passcode to a known user device, and the like. In optional embodiments of the invention, authentication of the user may be continuous throughout the virtual reality computing session to ensure that the user continues to be the authenticated/verified user.

In response to authenticating users, at Event 430, access privileges are determined for each user based on the verified identity. The access privileges restrict or allow user access to other virtual objects and/or virtual locations. In specific embodiments of the access privileges are based on one or more roles assigned to the individual users, the roles and/or access privileges may be assigned by a third-party, such as an employer, organization, guardian/parent or the like. Access privileges may also be determined by accessing external databases, such as government agency databases or the like that list bad-actors or the like. In other specific embodiments of the method, the access privileges may be dynamically altered during the user's virtual reality computing session based on behaviors exhibited by the user during the virtual reality computing session.

In response to determining the access privileges, at Event 440. The access privileges are implemented. Activated for the user during the ensuing virtual reality computing session. In specific embodiments of the invention, implementation of the access privileges may include defining virtual spheres of proximity around a virtual location or virtual object which restricts accesses by blocking the user's virtual object from entering the virtual location of interacting with the virtual object and/or presenting a restrictive access notification to the user that notifies the user that the virtual location or virtual object is restricted to the user.

Thus, present embodiments of the invention discussed in detail above, provide for the control of access privileges within virtual reality computing system(s), such as Metaverse or the like. Once a user requests entry into a virtual reality computing environment and their identity is verified (i.e., authenticating), access privileges are determined/assigned for the user that restrict or allow user access to virtual locations and/or virtual objects/avatars present in the environment. In specific embodiments of the invention, the access privileges may be dynamically altered during the user's virtual reality computing session based on the user's interactions or other behaviors exhibited during the user's virtual reality computing session. As such the present invention provides necessary control over what areas of a virtual reality computing environment a user can access and/or which virtual objects/avatars a user can interact with.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for controlling access privileges within virtual reality computing environments, the system comprising:
    at least one virtual reality computing system, each virtual reality computing system having a computing platform including a memory and one or more computing processor devices in communication with the memory, wherein the memory stores:
    a virtual reality application executable by at least one of the one or more computing processor devices and configured to:
        present a virtual reality computing environment that includes a plurality of virtual locations defined by virtual boundaries, each virtual location associated with a non-virtual entity and is configured to present a plurality of virtual objects, each virtual object is under control of a user and configured to virtually interact with (i) other virtual objects from amongst the plurality of virtual objects and (ii) the plurality of virtual locations;
    an authentication application executable by at least one of the one or more computing processor devices and configured to:
        in response to users requesting entry to the virtual reality computing environment, authenticate an identity of each user of the plurality of virtual objects,
    an access control application executable by at least one of the one or more computing processor devices and configured to:
        in response to authenticating the identity of the users, determine access privileges for each user based at least on the identity of each user, wherein the access privileges restrict or allow user access to at least one chosen from the group consisting of (i) one or more of the virtual locations, and (ii) one or more of the virtual objects, and
        implement the access privileges, for each user, during a corresponding user session within the virtual reality computing environment, and
    wherein the authentication application is further configured to authenticate the identity of each user of the plurality of virtual objects continuously throughout the corresponding user session by implementing multi-factor authentication at various times throughout the corresponding user session, wherein at least one chosen from the group consisting of (i) a type of multi-factor authentication and (ii) a time for implementing multi-factor authentication is determined based on one or more user session parameters.

2. The system of claim 1, wherein the access control application is further configured to restrict user access to at least one chosen from the group consisting of (i) one or more of the virtual locations, and (ii) one or more of the virtual objects by:
    defining a virtual sphere of proximity for each of the at least one of (i) the one or more of the virtual locations, and (ii) the one or more of the virtual objects, and
    in response to a virtual object associated with an authenticated user coming in contact with the virtual sphere of proximity, providing for at least one chosen from the group consisting of (i) forbidding the virtual object from further interaction with the corresponding virtual location or the corresponding virtual object, and (ii) presenting a visual or audible warning to the user that notifies the user of their restricted access to the corresponding virtual location or corresponding virtual object.

3. The system of claim 1, wherein the access control application is further configured to determine access privileges for each user based further on at least one role associated with the identity of each user.

4. The system of claim 1, wherein the access control application is further configured to:
    monitor, for each user, virtual interactions between a virtual object associated a corresponding user and (i) the other virtual objects and (ii) the plurality of virtual locations,
    as a result of the monitoring, determine that the virtual object associated with the corresponding user interacts with at least one chosen from the group consisting of (i) the one or more of the virtual locations having access restrictions, and (ii) the one or more of the virtual objects having access restrictions, and
    in response to determining an interaction, alter the access privileges for a corresponding user during at least one chosen from the group consisting of (i) the user session and (ii) further user sessions within the virtual reality computing environment.

5. The system of claim 1, wherein the access control application is further configured to determine the access privileges for each user by accessing an internal database that stores access privileges for each user, wherein at least a portion of the stored access privileges are defined by a third-party entity other than the user and the virtual reality computing system.

6. The system of claim 1, wherein the access control application is further configured to determine the access privileges for each user by accessing an external database that stores data associated with one or more of the users and determining the access privileges for the least one or more of the users based at least on the data.

7. The system of claim 1, wherein the access control application is further configured to determine the access privileges wherein the access privileges further restrict or allow other virtual objects associated with other users to interact with the virtual object controlled by the user.

8. The system of claim 1, wherein the one or more user session parameters include at least one chosen from the group consisting of (i) current duration of the user session, (ii) current virtual location of the user within the virtual reality computing environment, (iii) actual physical location at which the user is currently located, (iv) a virtual reality computing system from amongst the at least one virtual reality computing system, (v) a computing device which the user is using to conduct the user session, (vii) direction or speed of movement of the virtual object controlled by the user during the user session, (viii) current behaviors of the user during the user session, and (ix) previous behaviors of the user during previous user sessions.

9. The system of claim 1, the at least one virtual reality computing system comprises a plurality of virtual reality computing systems that are interconnected by one or more computing networks and provide for the users to navigate between the virtual reality computing environments of the plurality of virtual reality computing systems, wherein the access control application are further configured to implement the access privileges across the virtual reality computing environments of the plurality of virtual reality computing systems.

10. A computer-implemented method for controlling access privileges within virtual reality computing environments, the method executed by one or more computing processor devices and comprising:
presenting at least one virtual reality computing environment that includes a plurality of virtual locations defined by virtual boundaries, each virtual location associated with a non-virtual entity and is configured to present a plurality of virtual objects, each virtual object under control of a user and configured to virtually interact with (i) other virtual objects from amongst the plurality of virtual objects and (ii) the plurality of virtual locations;
in response to users requesting entry to the at least one virtual reality computing environment, authenticating an identity of each user of the plurality of virtual objects;
determining access privileges for each user based at least on the identity of each user, wherein the access privileges restrict or allow user access to at least one chosen from the group consisting of (i) one or more of the virtual locations, and (ii) one or more of the virtual objects;
implementing the access privileges, for each user, during a corresponding user session within the virtual reality computing environment; and
continuously authenticating the identity of each user of the plurality of virtual objects throughout the corresponding user session by implementing multi-factor authentication at various times throughout the corresponding user session, wherein at least one chosen from the group consisting of (a) a type of multi-factor authentication and (b) a time for implementing multi-factor authentication is determined based on one or more user session parameters.

11. The computer-implemented method of claim 10, wherein implementing the access privileges further comprises:
defining a virtual sphere of proximity for each of the at least one of (i) the one or more of the virtual locations, and (ii) the one or more of the virtual objects, and
in response to a virtual object associated with an authenticated user coming in contact with the virtual sphere of proximity, providing for at least one chosen from the group consisting of (i) forbidding the virtual object from further interaction with the corresponding virtual location or the corresponding virtual object, and (ii) presenting a visual or audible warning to the user that notifies the user of their restricted access to the corresponding virtual location or corresponding virtual object.

12. The computer-implemented method of claim 10, further comprising:
monitoring, for each user, virtual interactions between a virtual object associated a corresponding user and (i) the other virtual objects and (ii) the plurality of virtual locations;
as a result of the monitoring, determining that the virtual object associated with the corresponding user interacts with at least one chosen from the group consisting of (i) the one or more of the virtual locations having access restrictions, and (ii) the one or more of the virtual objects having access restrictions; and
in response to determining an interaction, altering the access privileges for a corresponding user during at least one chosen from the group consisting of (i) the user session and (ii) further user sessions within the virtual reality computing environment.

13. The computer-implemented method of claim 10, wherein the one or more user session parameters include at least one chosen from the group consisting of (i) current duration of the user session, (ii) current virtual location of the user within the virtual reality computing environment, (iii) actual physical location at which the user is currently located, (iv) a virtual reality computing system from amongst the at least one virtual reality computing system, (v) a computing device which the user is using to conduct the user session, (vii) direction or speed of movement of the virtual object controlled by the user during the user session, (viii) current behaviors of the user during the user session, and (ix) previous behaviors of the user during previous user sessions.

14. A computer program product comprising:
a non-transitory computer-readable medium comprising sets of codes for causing one or more computing processing devices to:
present at least one virtual reality computing environment that includes a plurality of virtual locations defined by virtual boundaries, each virtual location associated with a non-virtual entity and is configured to present a plurality of virtual objects, each virtual object under control of a user and configured to virtually interact with (i) other virtual objects from amongst the plurality of virtual objects and (ii) the plurality of virtual locations;
in response to users requesting entry to the at least one virtual reality computing environment, authenticate an identity of each user of the plurality of virtual objects;

determine access privileges for each user based at least on the identity of each user, wherein the access privileges restrict or allow user access to at least one chosen from the group consisting of (i) one or more of the virtual locations, and (ii) one or more of the virtual objects;

implement the access privileges, for each user, during a corresponding user session within the virtual reality computing environment;

authenticate the identity of each user of the plurality of virtual objects continuously throughout the corresponding user session by implementing multi-factor authentication at various times throughout the corresponding user session, wherein at least one chosen from the group consisting of (a) a type of multi-factor authentication and (b) a time for implementing multi-factor authentication is determined based on one or more user session parameters; and continuously authenticate the identity of each user of the plurality of virtual objects continuously throughout the corresponding user session by implementing multi-factor authentication at various times throughout the corresponding user session, wherein at least one chosen from the group consisting of (a) a type of multi-factor authentication and (b) a time for implementing multi-factor authentication is determined based on one or more user session parameters.

15. The computer program product of claim 14, wherein the set of codes for causing the one or more computing processing devices to implement the access privileges further cause the one or more computing processing devices to:

define a virtual sphere of proximity for each of the at least one of (i) the one or more of the virtual locations, and (ii) the one or more of the virtual objects, and in response to a virtual object associated with an authenticated user coming in contact with the virtual sphere of proximity, provide for at least one chosen from the group consisting of (i) forbidding the virtual object from further interaction with the corresponding virtual location or the corresponding virtual object, and (ii) presenting a visual or audible warning to the user that notifies the user of their restricted access to the corresponding virtual location or corresponding virtual object.

16. The computer program product of claim 14, wherein the sets of codes further comprise sets of codes for causing the one or more computing processing devices to:

monitor, for each user, virtual interactions between a virtual object associated a corresponding user and (i) the other virtual objects and (ii) the plurality of virtual locations;

as a result of the monitoring, determine that the virtual object associated with the corresponding user interacts with at least one chosen from the group consisting of (i) the one or more of the virtual locations having access restrictions, and (ii) the one or more of the virtual objects having access restrictions; and in response to determining an interaction, alter the access privileges for a corresponding user during at least one chosen from the group consisting of (i) the user session and (ii) further user sessions within the virtual reality computing environment.

17. The computer program product of claim 14, wherein the one or more user session parameters include at least one chosen from the group consisting of (i) current duration of the user session, (ii) current virtual location of the user within the virtual reality computing environment, (iii) actual physical location at which the user is currently located, (iv) a virtual reality computing system from amongst the at least one virtual reality computing system, (v) a computing device which the user is using to conduct the user session, (vii) direction or speed of movement of the virtual object controlled by the user during the user session, (viii) current behaviors of the user during the user session, and (ix) previous behaviors of the user during previous user sessions.

* * * * *